(No Model.)
C. E. ANDERSON.
LINE CHALKING APPARATUS.
No. 517,720.  Patented Apr. 3, 1894.
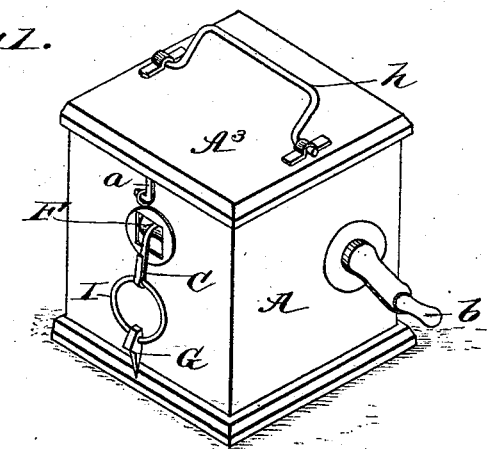
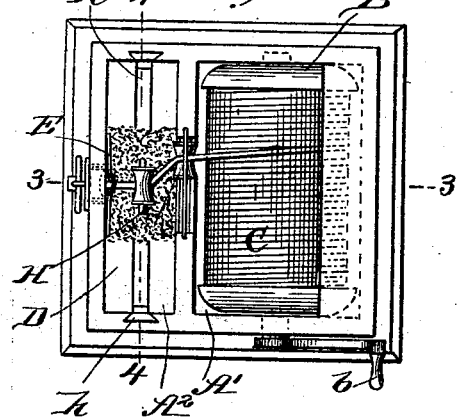
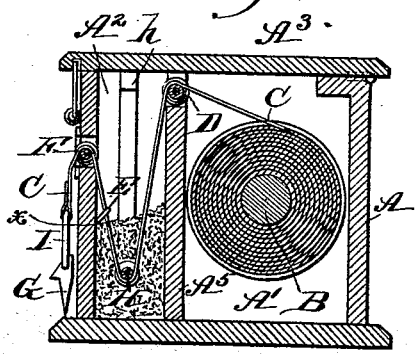
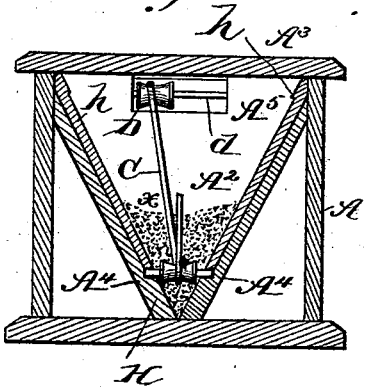
WITNESSES:
Fred J. Deterich
Edw. U. Byrn
INVENTOR
Carl E. Anderson
BY Munn & Co
ATTORNEYS.
THE NATIONAL LITHOGRAPHING COMPANY,
WASHINGTON, D. C.

UNITED STATES PATENT OFFICE.

CARL E. ANDERSON, OF WOOD'S HOLL, MASSACHUSETTS.

LINE-CHALKING APPARATUS.

SPECIFICATION forming part of Letters Patent No. 517,720, dated April 3, 1894.

Application filed November 16, 1893. Serial No. 491,101. (No model.)

*To all whom it may concern:*

Be it known that I, CARL E. ANDERSON, of Wood's Holl, in the county of Barnstable and State of Massachusetts, have invented a new and useful Improvement in Line-Chalking Apparatus, of which the following is a specification.

My invention relates to devices for conveniently holding and keeping in a cleanly and compact way the chalk line used by carpenters, gardeners, and other artisans, and automatically supplying the same with chalk in a uniform and regulated quantity.

It consists in the peculiar construction and arrangement of parts of the device which I will now proceed to more fully describe with reference to the drawings, in which—

Figure 1 is a perspective view of the exterior of the box or casing. Fig. 2 is a plan view with the cover removed. Fig. 3 is a vertical section taken through the line 3—3 of Fig. 2, and Fig. 4 is a vertical section taken through the line 4—4 of Fig. 2.

Similar letters of reference in the several figures refer to the same parts.

In the drawings A represents a box or casing made preferably of wood and of a size adapted to the length of the chalk line used. This box has a hinged cover $A^3$ with a suitable fastening $a$ and has also a handle $h$ for convenience in transportation. This box is divided internally by a partition $A^5$ into two compartments $A'$ $A^2$. The compartment $A'$ is the larger of the two, and in it is journaled in suitable bearings in the side of the box a reel or spool B, upon which is wound the chalk line C by means of crank handle $b$. The other compartment $A^2$ is designed to receive the powdered chalk, and is narrowed at its bottom by inclined boards $A^4$ $A^4$, see Fig. 4, so as to form a hopper or V-shaped receptacle. This causes the chalk always to feed down to the middle of the bottom of the box so that the last remnants of chalk may be effectively applied to the cord and used up, even when but a small quantity is in the box.

In the top of the partition $A^5$ is formed an elongated slot in which is fixed an axial shaft $d$ upon which rotates a broad faced concave guide pulley or roller D. This roller carries the cord as it passes from the spool B over into the chalk chamber, and as the cord plays back and forth in its spiral lay upon the spool this guide roller is permitted by the length of its axis $d$ to move back and forth to accommodate itself to the cord. After the cord passes over pulley D it descends nearly to the bottom of the chalk chamber, and, passing around a similar roller H, rises again and passes over a roller F in the front wall of the box, and, emerging through the same, is connected to the ring I carrying sharpened pin or peg G by which its end may be connected to any point when in use; the ring I permitting it to be hooked over a nail, screw or other projection, when in use and to prevent the line from being drawn entirely into the box, while the sharpened peg G permits the line to be attached to a wall, the surface of the earth, or other plane surface. The roller H is journaled directly in the walls $A^4$ $A^4$ of the chalk chamber, whose convergence at the bottom is sufficient to permit this. As the chalk line rises from roller H and the mass of chalk powder $x$, all surplus chalk which may adhere is scraped off by a loop bar or scraper E, so that it does not foul the box or its surroundings in passing out.

I am aware that a chalk box having a spring roller within the same to wind up the line, and a chalk chamber adjacent to it through which the line passes and is chalked, has been heretofore used, and I therefore only claim my peculiar construction and arrangement of parts, which is much simpler and cheaper, and is not liable to get out of order as do these spring actuated rollers whose springs frequently get so weakened in power as to fail to take up and rewind the line.

In adapting my device to the use of gardeners where the chalking of the line is not necessary, the roller H is made detachable so that the line need not pass through the chalk at all, and for this purpose the sides $A^4$ $A^4$ of the chalk chamber are grooved with a dovetail channel down to the journals of roller H, and dovetail slides $h$ $h$ are inserted in these channels and held down by the lid of the box. These slides hold the roller down in its bearings in the sides $A^4$, and yet they may be easily and quickly removed to allow the roller to be removed when it is not required to be used.

Having thus described my invention, what I claim as new, and desire to secure by Letters Patent, is—

1. A line chalking apparatus, consisting of a two compartment box, one compartment of which is made V-shaped at the bottom and is adapted to receive the chalk, and the other of which is provided with a spool or reel, guide rollers arranged respectively in the partition between the compartments and the bottom of the V-shaped chamber, and the chalk line wound about the reel and descending to and passing around the roller in the bottom of the V-shaped chalk chamber substantially as and for the purpose described.

2. In a line chalking apparatus, the combination with the compartment for chalk; of a guide roller for the line arranged in the bottom of said chalk compartment, and means for locking said roller there or removing it substantially as shown and described.

3. In a line chalking apparatus, the combination of grooved walls $A^4 A^4$, the roller H, and retaining slides $h\ h$ substantially as and for the purpose described.

4. A line chalking apparatus consisting of a two compartment box, one compartment of which is made V-shaped at the bottom and is adapted to receive the chalk, and the other of which is provided with a spool or reel, guide rollers arranged respectively in the partition between the compartments, in the bottom of the chalk chamber, and the external wall of the box, and the chalk line passing over the rollers in the partition and box wall, and under the roller in the bottom of the chalk chamber substantially as shown and described.

5. The combination of the box A having two compartments with laterally adjustable roller D in the partition between the compartments, the spool B arranged in one compartment to receive the line, roller H arranged in the bottom of the chalk chamber, roller F arranged in the side of the box, and the chalk line wound about the reel and over the guide rollers and having attached outside the box a ring I with sharpened peg or pin G substantially as and for the purpose described.

CARL E. ANDERSON.

Witnesses:
L. W. BRANNAN.
ALFRED SIMPSON.